(12) United States Patent
Brandstätter

(10) Patent No.: US 10,230,523 B2
(45) Date of Patent: Mar. 12, 2019

(54) COMPUTER IMPLEMENTED METHOD FOR GENERATING A RANDOM SEED WITH HIGH ENTROPY

(71) Applicant: HOB GmbH & Co. KG, Cadolzburg (DE)

(72) Inventor: Klaus Brandstätter, Roßtal (DE)

(73) Assignee: HOB GMBH & CO. KG, Cadolzburg (DE)

( * ) Notice: Subject to any disclaimer, the term of this patent is extended or adjusted under 35 U.S.C. 154(b) by 0 days.

(21) Appl. No.: 15/439,156

(22) Filed: Feb. 22, 2017

(65) Prior Publication Data
US 2017/0244560 A1 Aug. 24, 2017

(30) Foreign Application Priority Data
Feb. 22, 2016 (EP) ..................... 16156762

(51) Int. Cl.
*H04L 29/06* (2006.01)
*H04L 9/08* (2006.01)
*G06F 7/58* (2006.01)
*H04L 29/08* (2006.01)

(52) U.S. Cl.
CPC .............. *H04L 9/0869* (2013.01); *G06F 7/58* (2013.01); *G06F 7/588* (2013.01); *H04L 9/0861* (2013.01); *H04L 67/02* (2013.01); *H04L 2209/24* (2013.01)

(58) Field of Classification Search
None
See application file for complete search history.

(56) References Cited

U.S. PATENT DOCUMENTS

| | | | | |
|---|---|---|---|---|
| 4,965,827 A * | 10/1990 | McDonald | ........... | G06Q 20/341 380/29 |
| 5,892,900 A * | 4/1999 | Ginter | ..................... | G06F 21/10 726/26 |
| 5,910,987 A * | 6/1999 | Ginter | ..................... | G06F 21/10 348/E5.006 |
| 6,237,786 B1 * | 5/2001 | Ginter | ..................... | G06F 21/10 213/153 |
| 7,827,223 B2 * | 11/2010 | Gressel | ................... | G06F 7/582 708/250 |
| 2008/0189356 A1 | 8/2008 | Thomas et al. | | |
| 2010/0023749 A1 | 1/2010 | Kelly | | |
| 2010/0067687 A1 * | 3/2010 | Chandramouli | ...... | H04L 9/0618 380/37 |
| 2015/0067875 A1 * | 3/2015 | Johnson | .................. | G06F 21/14 726/26 |
| 2015/0082425 A1 | 3/2015 | Johnson et al. | | |

OTHER PUBLICATIONS

Cherkaoui Aboelkarim et al.,"A Very High Speed True Random Number Generator with Entropy Assessment", International Association for Cryptologic Research, pp. 179-196 (Aug. 2013).
(Continued)

*Primary Examiner* — Maung T Lwin
(74) *Attorney, Agent, or Firm* — Browdy and Neimark, PLLC

(57) ABSTRACT

In a computer implemented method for generating a random seed with high entropy as an entropy source a machine instruction 'compare-and-swap' -CAS- is used to calculate a random seed.

11 Claims, 1 Drawing Sheet

(56) References Cited

OTHER PUBLICATIONS

D. Eastlake et al.,"Randomness Requirements for Security", The Internet Society, pp. 1-48 (Jun. 2005).
R. Fielding et al.,"HTTP/1.1", The Internet Society, pp. 1-114 (Jun. 1999).
Vlaoislav Petkov et al,"Characterizing per-application network traffic using entropy", ACM Transactions on Modeling ANO Computer Simulation, pp. 1-25 (May 2013).
"IBM System/370 Principles of Operation", International Business Machines Corporation, pp. 1-568 (Mar. 1983).
"Transmission Control Protocol" DARPA Internet Program Protocol Specification, pp. 1-90 (Sep. 1981).
Bovet et al.,"Understanding the Linux Kernel", O'Reilly, pp. 1-1176 (Nov. 2005).

\* cited by examiner

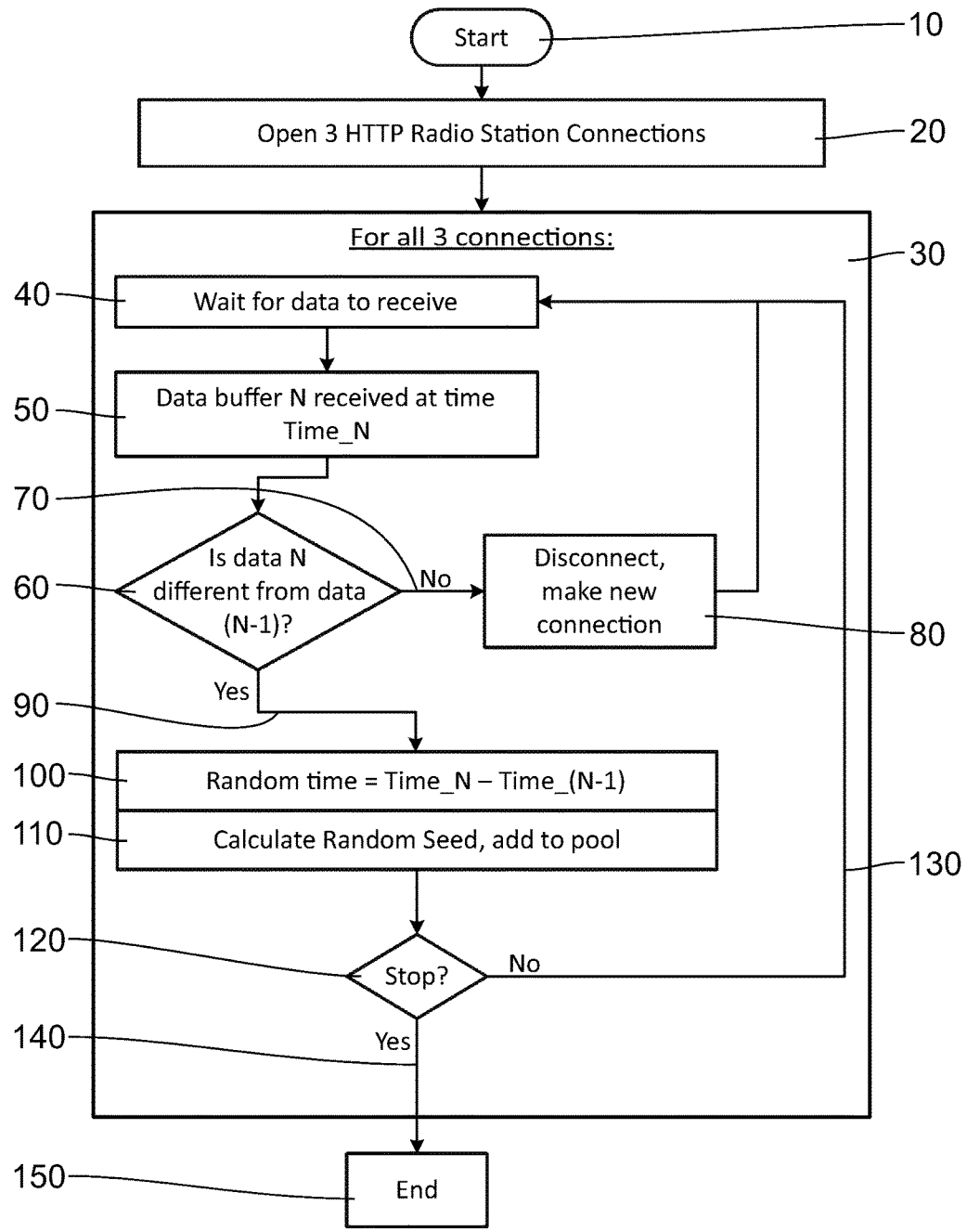

COMPUTER IMPLEMENTED METHOD FOR GENERATING A RANDOM SEED WITH HIGH ENTROPY

CROSS-REFERENCES TO RELATED APPLICATIONS

This application claims the priority of European Patent Application, Serial No. 16 156 762.3, filed Feb. 22, 2016, pursuant to 35 U.S.C. 119(a)-(d), the content of which is incorporated herein by reference in its entirety as if fully set forth herein.

FIELD OF THE INVENTION

The invention refers to a computer implemented method for generating a random seed with high entropy.

BACKGROUND OF THE INVENTION

As to the background and object underlying the present invention it is to be explained that for cryptographic functions, random numbers are needed. These random numbers are also called nonce. To generate random numbers, often a certain seed is used to initialize a random number generator. From this seed, multiple random numbers are generated, till the seed is exhausted and a new seed is needed.

A seed is defined as an integer, used to set the starting point for generating a series of random numbers. The seed sets the generator to a random starting point. A unique seed returns a unique random number sequence.

This seed or random number is e.g. used in encryption of network-traffic like SSL (Secure Sockets Layer) which is now called TLS (Transport Layer Security), in iPsec (Internet Protocol Security), to mention only the most important protocols.

The Diffie-Hellman key exchange is also based on random numbers. When an attacker knows the random numbers, he can decrypt the encrypted messages and also tamper the messages.

When there is a weak random seed, meaning the random generator has only little entropy, an attacker can limit the possible random numbers and so can make a brute-force-attack against the random, meaning he tries all possible random numbers to hack the data, i.e. to decrypt the encrypted data.

Entropy is a measure of unpredictability of information content. More about random and seed can be found in the publication RFC 4086, "Randomness Requirements for Security" of Eastlake et al., Motorola Laboratories, © The Internet Society 2005.

For computer applications which want to use encrypted network traffic, it is common use that the seed is generated at that time when the application is started. The same is also true for servers serving multiple clients. Only when the seed is exhausted, meaning a certain pre-defined number of unique random numbers have been generated, the application needs to generate a new seed. This is called re-seeding.

Computers are machines which do the same thing in the same way every time they do it. So, as computers execute programs in the same way every time and every time the program runs, it is not trivial to generate a random number or seed with a computer.

In the book Bovet, Daniel P., "Understanding the Linux Kernel" of Nov. 17, 2005 there is explained a function SA_SAMPLE_RANDOM. Accordingly the device may be considered a source of events that occur randomly; it can thus be used by the kernel random number generator. Users can access this feature by taking random numbers from the /dev/random and /dev/urandom device files. So the Linux kernel makes random/seed from interrupts and network traffic.

To get a random or seed, multiple sources can be used so to get a seed with high entropy. When a computer is started, processes needing random numbers should not need to wait a long time for the process of getting seed with high entropy. In order to keep this time short, a number of external entropy sources can be combined.

As concerns prior art documents US 2008/0189356 A1 discloses a broad variety of entropy sources which are said to be poor, like the combination of inter-keystroke timings, mouse-coordinate deltas or inter-interrupt timing values on a local machine. To enhance the situation this publication proposes to use further entropy sources based on network interface parameters, like a packet length, an amount of time between receipt of packets, the rate of collisions of packets or the like wherein the packets are interchanged by wired, wireless or combined connection techniques.

Further publications, like
US 2015/082425 A1,
CHERKAOUI ABDELKARIM ET AL: "A Very Speed True Random Number Generator with Entropy Assessment", Aug. 20, 2013, Correct System Design, SPRINGER INTERNATIONAL PUBLISHING, CHAM, Pages 179-196, XP047036750, ISSN: 0302-9743, ISBN: 978-3-642-36616-1
VLADISLAV PETKOV ET AL: "Characterizing per-application network traffic using entropy", ACM TRANSACTIONS ON MODELING AND COMPUTER SIMULATION, ACM, NEW YORK.; N.Y.; US, vol. 23, no. 2 10 May 2013, pages 1-25, XP058018270, ISSN: 1049-3301, DO1: HTTP.//DX-.DOI.ORG/10.1145/2457459.24574463, and
US 2010/023749 A 1
are to be cited as technological background, as they disclose a very broad variety of entropy sources, however, are silent about the basic entropy source of the invention described in the following.

SUMMARY OF THE INVENTION

It is a general object underlying the present invention to make available easily accessible sources of entropy as high as possible.

This object is resolved by a computer implemented method for generating a random seed with high entropy, which is characterized by the use of a basically known machine instruction CAS, which means "compare-and-swap". In computer science, CAS is an atomic instruction used in multithreading to achieve synchronization. It compares the contents of a memory location to a given value and, only if they are the same, modifies the contents of that memory location to a given new value. This is done as a single atomic operation. The atomicity guarantees that the new value is calculated based on up-to-date information; if the value had been updated by another thread in the meantime, the write would fail.

This CAS instruction can be used preferably by
using on each machine thread a program including the machine instruction CAS during multithreading on at least two machine threads, which may also run on different CPU (Central Processing Unit) cores, the program filling a last-in-first-out-queue list and removing elements in a certain pattern until the list is destroyed by the program, and using the random-affected moment of destruction of the list to calculate the random seed.

This is preferably done by running at least two machine threads on different CPU cores of a computer.

To avoid unnecessary double explanation for further details and advantages of the aforesaid basic concept of the invention attention is drawn to the description of the Example 1 described below.

BRIEF DESCRIPTION OF THE DRAWINGS

The invention will be described in more detail in the following explanation referring to the accompanying figure, in which FIG. 1 which shows a flow diagram of a preferred embodiment of the method according to the invention using three Internet radio stations.

DETAILED DESCRIPTION

To improve the achievable entropy the basic concept of using the CAS instruction can be supplemented by using further entropy sources. According to a preferred embodiment of the invention a method includes the steps of connecting the computer to at least one Internet based sender of data packets, which are sent by packet switching within a given time pattern, detecting the moment of receipt of consecutively received data packets, determining the random-affected time differences between the moment of receipt of consecutively received data packets, and calculating a random seed from the random-affected time differences.

As an additional source for the random seed this invention uses Internet traffic. Radio stations and also television stations and other news tickers send data over the public Internet. Now when such data are received over the public Internet, there is always some jitter, because the public Internet is based on packet switching, and the packets of different source and destination share the same lines. Accordingly the time difference for transmissions between the sender and the receiver varies. This means that consecutive packets are received in varying time intervals by the receiving computer and an application. Thus random seed can effectively be generated by using these random-affected time intervals which have a sufficient high entropy as could be seen from according tests.

Further preferred embodiments of the invention refer to additional sources of entropy to generate effectively random seeds. So as sending data over the public Internet is mostly done with the protocol HTTP (Hypertext Transfer Protocol, see RFC 2616 for HTTP/1.1) which is based on TCP (Transmission Control Protocol, RFC 793) these protocols can preferably be used by Web browsers implementing the present invention. It would also be possible to send (or receive) this Internet traffic over other protocols, like UDP.

In a further preferred embodiment the computer records at least one Internet based sender which is sending audio data packets, video data packets or like information data packets. This can be done by means of an operating system function implemented in the computer's operating system the current moment of receipt of a data packet is determined with a resolution in the magnitude of nanoseconds as explained hereafter.

Today's computers and operating systems contain fine-grained APIs (Application Programming Interface) to retrieve the current time, for example:

- clock_gettime( CLOCK_REALTIME, . . . ) in Unix and
- QueryPerformanceCounter( ) in Windows.

The resolution of these functions is in the magnitude of nanoseconds. Accordingly such an application can measure the current time when an Internet packet of an Internet Radio or another sender is received, and generate a random or seed from the time differences when consecutive packets are received. Due to aforementioned resolution and the degree of the practically occurring jitter in the moments of receipt of the data packets this gives an advantageous high entropy.

According to a further preferred embodiment of the invention the computer is connected in parallel to several Internet based senders, combining the random-affected time differences in the moment of receipt of consecutively received data packets from the several senders to calculate the random seed. So the random generator of this invention, receiving messages from the public Internet, can be configured and used so that it uses different Internet connections in parallel, at the same time.

This is advantageous for example for big organisations or companies which have multiple connections to the public Internet. Firstly the basis of entropy is broadened by this measure and secondly when one connection fails, there are still other ways to exchange data over the public Internet and thus to find a source of entropy which can be used for determining the random seed. Besides for a hacker or an attacker, it gets much more complicated to record all Internet connections of an organization, if he wants to record the data or events which are used to generate the random.

Further on it is a preferred method step of the invention to mix the random of the random-affected time differences between the moment of receipt of consecutively received data packets with at least one further entropy source, preferably the random generated by detecting the content of the received data packets. Although it is important that the necessary entropy is derived from the time differences of the received data packets detected in a time resolved manner the random may be improved when the content of the received messages is also applied to the random. Basically the random time values generated by the jitter of the data flow can be mixed with the received random data by applying routines described in above-mentioned RFC 4086, for example an appropriate hashing function, like the simple logical function XOR. All this is done as an extra measure to improve the entropy achievable by the basic CAS seed generation concept.

EXAMPLE 1

As a basic source for getting random seed the special machine instruction CAS is used.

As today's computers have multiple CPU cores and are running multiple threads which all can access the same memory location, CAS is needed and is implemented in many different hardware platforms. Now, this special instruction can be used to access a LIFO (last-in first-out) queue in memory.

Now in the document "IBM System/370 Principles of Operation GA22-7000-4 Lock/Unlock with LIFO Queuing for Contentions Free-Pool-List Manipulation", there is the following basic information how CAS works:

"Consider a chained list of the type used in the LIFO lock/unlock example. Assume that the first two elements are at locations A and B, respectively. If one program attempted to remove the first element and was interrupted between the fourth and fifth instructions of the LUNLK routine, the list could be changed so that elements A and C are the first two elements when the interrupted program resumes execution. The CS"—(Remark: IBM uses the term 'CS' instead of the term 'CAS' used in this patent application)—"instruction would then succeed in storing the value B into the header, thereby destroying the list."

For this invention, to generate a random seed, a short software program part is used with the special instruction CAS and running this program on multiple threads. It fills a LIFO queue and removes elements in a certain pattern. As in the IBM description, the list is destroyed, and the program detects when the list is destroyed. It is not predictable at what time the list will be destroyed, so this time can be used as a source for the random seed.

For an approximate calculation of the expected entropy, which can be gained by the described procedure, the following assumptions are made:

The time of detecting the destruction of the queue list through a conflict event in Intel x86 CPUs is given in time steps of around 300 nanoseconds.

The following calculation uses these approximate equations:

$$300 \sim 256 = 2^8, \qquad \text{I.}$$

$$10^3 = 1000 \sim 1024 = 2^{10}. \qquad \text{II.}$$

Within an observed time of one second and an accuracy of time measure in nanoseconds, the time quantum would be $10^9$.

Supposed that $10^9 \sim 2^{30}$ (see above equation II), divided by the above assumed destruction granularity of $2^8$ (see above equation I), an entropy of 22 (30–8) bits would be expected out of this calculation.

One does not get time intervals from the conflict events, only, but also from other random numbers, like the threat numbers and the queue element numbers where the conflict events happen, and other numbers. At all one may get 16 ($=2^4$) random numbers additionally.

Data, which is used for calculating the random seed, is taken from:
the execution time until the next fault event occurs,
the threat number where the fault event was detected,
the number of the element in the queue where the fault event was detected,
the number of loops that have been running in that threat where the fault event was detected.

In summary 22+4=26 bits of entropy per second are to be expected.

When this process is run for a longer time, for example about ½ minute, and assumed that the events in every observed second are independent, one can add the bits of entropy of every second. This results in 26*30=780 bits entropy within 30 seconds.

Tests when running a preferred implementation show that the results depend strongly on the hardware of the computer machine, especially on the number of available CPU cores. On some machines truly tens of thousands of bits of entropy can be generated in one second.

Following program examples can be given to realize the CAS based random seed generator:

In Pseudocode the routine to access LIFO queues—with the described object—can be given as:

```
Initialize (ff = pointer to LIFO queue, dummy: pointer to dummy memory cell)
I1: ff->head = null    # initialize the head cell dequeue (ff = pointer to LIFO queue): pointer to memory cell
D1: head = ff->head              # read the head cell
D2: loop                         # try until dequeue is done
D3:   if head == NULL            # is queue empty ?
D4:     return NULL
D5:   endif
D6:   next = head->next          # read the next memory cell
D7:   CAS (&ff->head, head, next)
D8:   if successful break
D9: endloop
D10: return head enqueue (ff = pointer to LIFO queue, cl = pointer to memory cell)
E1: head = ff->head              # read the head memory cell
E2: loop                         # try until enqueue is done
E3:   cl->next = head            # set the cell next pointer to NULL
E4:   CAS (&ff->head, head, cl)
E5:   if successful break
E6: endloop
E7: return
```

Following explanations are to be given:
E4: CAS compares the second operand with the content of the first operand.

When these are equal, the third operand is copied to the content of the first operand and the condition code is set to SUCCESSFUL.

In case they are not equal, the content of the first operand is copied into the second operand and the condition code is set to FAILED.

The routine which detects the object, and where the data are used for the random, looks like this:
R1: get entry from store
R2: mark with pattern
R3: sleep or do something else
R4: check if still same pattern
R5: put entry back to store
R6: sleep or do something else
R7: next iteration
when check fails: error occurred before
or
R1: get n entries from store, mark each entry with unique pattern
R2: sleep or do something else
R3: check each (n) entry and put entry back to store
R4: sleep or do something else
R5: next iteration
when check fails: error occurred before The basic idea behind these CAS routines is, that multiple threads or cores of a CPU work concurrently under conditions that allow these errors to occur. The randomness is taken from the unpredictable proceeding in which these errors occur, regarding the time difference between two consecutive events and some other event related data serving as processible output. When only one core is used, the routine still works in a preemptive operation system, but the faults occur only very seldom.

EXAMPLE 2

To enhance the entropy achieved by using the CAS instruction as explained under example 1 further entropy sources can be admixed according to the following explanation, referring to FIG. 1 which shows a flow diagram of a preferred embodiment of the method according to the invention using three Internet radio stations.

Beginning with step 10 "Start" in the next step 20 three Internet radio stations are connected to a computer on which the random seed is to be calculated. The connections are configured to receive audio data packets continuously in a loop for some time under the HTTP protocol.

The loop box 30 illustrates the method routine running for each of the three connections. Basically the computer in step 40 waits for data to receive from the Internet radio stations via all three connections. In step 50 for each received data buffer N the moment of receipt in nanoseconds is retrieved from the system. In the query 60 it is checked whether data N is different from the previous data (N−1). If "no"—branch 70—the connection is disconnected and a new connection is made—step 80. The process is redirected to step 40 "Wait for data to receive".

If in query 60 the answer is "yes"—branch 90—the process proceeds to step 100 in which the random affected time difference between the moment of receipt of buffer N and the moment of receipt of buffer (N−1) is calculated.

In step 110 the random seed is calculated incorporating for example the entropy of the buffer N data by a bitwise exclusive OR (XOR) operation. The resulting random seed is added to the seed pool of the employed or random generator of the computer in this step.

The final STOP-query 120 is made. When the processes is to be continued by choosing "No"—branch 130—the process is redirected to step 40. If the process is to be terminated by choosing "Yes"—branch 140—it proceeds to step 150—"End".

What is claimed is:

1. A computer implemented method for generating a random seed with high entropy, using a computer instruction Compare and Swap (CAS) as an entropy source to generate the random seed, the method comprising executing on a Central Processing Unit (CPU) of a computer, a computer program comprising a plurality of instructions to implement the steps of:
   executing the computer instruction CAS on each computer thread during multithreading on at least two computer threads,
   filling, via some of the plurality of instructions in the program, a last-in-first-out-queue list and removing elements from the last-in-first-out-queue list in a certain pattern until the last-in-first-out-queue list is destroyed by the program,
   generating the random seed based on a random-affected moment of destruction of the last-in-first-out-queue list, and
   storing the generated random seed to a seed pool or using the random seed in a random number generator in the computer.

2. The computer implemented method according to claim 1, comprising running said at least two computer threads on different Central Processing Unit (CPU) cores of the computer.

3. The computer implemented method according to claim 1, comprising the steps of:
   connecting the computer to at least one Internet based sender of data packets, which are sent by packet switching within a defined time pattern,
   detecting an instant of time of receipt of each consecutively received data packet,
   determining the random-affected time differences between the instants of time of receipt of consecutively received data packets, and
   generating the random seed from said random-affected time differences.

4. The computer implemented method according to claim 3, wherein the data packets are sent under a public Internet protocol.

5. The computer implemented method according to claim 4, wherein the data packets are sent under one of Hypertext Transfer Protocol (HTTP), Transmission Transfer Protocol (TCP) and User Datagram Protocol (UDP).

6. The computer implemented method according to claim 3, further comprising recording, in the computer, transmissions of at least one Internet based sender that is sending one of audio data packets and video data packets.

7. The computer implemented method according to claim 3, further comprising, via an operating system function implemented in an operating system of the computer, determining the instant of time of receipt of each consecutively received data packet with a resolution in the magnitude of nanoseconds.

8. The computer implemented method according to claim 3, further comprising:
   connecting the computer in parallel to several Internet based senders, and
   combining the random-affected time differences in the instant of time of receipt of the consecutively received data packets from the several Internet based senders to generating the random seed.

9. The computer implemented method according to claim 3, further comprising mixing values of the random-affected time differences between the instant of time of receipt of the consecutively received data packets with at least one further entropy source by applying an appropriate hashing function.

10. The computer implemented method according to claim 9, further comprising mixing the values of the random-affected time differences between the instant of time of receipt of the consecutively received data packets with the random seed generated by detecting content of the received data packets by applying an appropriate hashing function.

11. The computer implemented method according to claim 9, further comprising mixing the values of the random-affected time differences between the instant of time of receipt of the consecutively received data packets with at least one further entropy source by applying a logical Exclusive-Or (XOR) function.

\* \* \* \* \*